(12) United States Patent
Kalogeropulos et al.

(10) Patent No.: US 9,032,379 B2
(45) Date of Patent: May 12, 2015

(54) PLATFORM SPECIFIC OPTIMIZATIONS IN STATIC COMPILERS

(71) Applicant: Oracle International Corporation, Redwood City, CA (US)

(72) Inventors: Spiros Kalogeropulos, Los Gatos, CA (US); Partha P. Tirumalai, Fremont, CA (US)

(73) Assignee: Oracle International Corporation, Redwood City, CA (US)

( * ) Notice: Subject to any disclaimer, the term of this patent is extended or adjusted under 35 U.S.C. 154(b) by 40 days.

(21) Appl. No.: 13/924,322

(22) Filed: Jun. 21, 2013

(65) Prior Publication Data
US 2014/0380289 A1 Dec. 25, 2014

(51) Int. Cl.
G06F 9/45 (2006.01)

(52) U.S. Cl.
CPC .................................... G06F 8/443 (2013.01)

(58) Field of Classification Search
None
See application file for complete search history.

(56) References Cited

U.S. PATENT DOCUMENTS

| | | | |
|---|---|---|---|
| 8,156,481 B1 * | 4/2012 | Koh et al. ..................... | 717/151 |
| 8,495,603 B2 * | 7/2013 | Archer et al. ................. | 717/149 |
| 2003/0051073 A1 * | 3/2003 | Mishra et al. ................ | 709/332 |
| 2006/0123398 A1 * | 6/2006 | McGuire ....................... | 717/127 |
| 2006/0236310 A1 * | 10/2006 | Domeika et al. .............. | 717/140 |
| 2008/0034355 A1 * | 2/2008 | Shen et al. .................... | 717/148 |
| 2008/0127134 A1 * | 5/2008 | Tirumalai et al. ............. | 717/140 |
| 2009/0177642 A1 * | 7/2009 | Chung et al. ...................... | 707/5 |
| 2010/0115501 A1 * | 5/2010 | Partridge et al. ............. | 717/148 |
| 2011/0067013 A1 * | 3/2011 | Frost et al. ................... | 717/148 |
| 2011/0258595 A1 * | 10/2011 | Clevenger ..................... | 717/106 |
| 2012/0198427 A1 * | 8/2012 | Schmidt ........................ | 717/151 |
| 2013/0139135 A1 * | 5/2013 | Ditu et al. ..................... | 717/156 |
| 2013/0339928 A1 * | 12/2013 | Trofin et al. .................. | 717/122 |

* cited by examiner

*Primary Examiner* — Dong Wong
*Assistant Examiner* — Daxin Wu
(74) *Attorney, Agent, or Firm* — Marsh Fischmann & Breygofle LLP; Daniel J. Sherwinter

(57) ABSTRACT

Embodiments include systems and methods for generating an application code binary that exploits new platform-specific capabilities, while maintaining backward compatibility with other older platforms. For example, application code is profiled to determine which code regions are main contributors to the runtime execution of the application. For each hot code region, a determination is made as to whether multiple versions of the hot code region should be produced for different target platform models. Each hot code region can be analyzed to determine if benefits can be achieved by exploiting platform-specific capabilities corresponding to each of N platform models, which can result in between one and N versions of that particular hot code region. Navigation instructions are generated as part of the application code binary to permit a target machine to select appropriate versions of the hot code sections at load time, according to the target machine's capabilities.

19 Claims, 5 Drawing Sheets

PLATFORM SPECIFIC OPTIMIZATIONS IN STATIC COMPILERS

FIELD

Embodiments relate generally to static compilers, and, more particularly, to platform specific optimizations in static compilers.

BACKGROUND

Over time, computational system capabilities change along with the capabilities of their processors. For example, different processor generations can have different clock speeds, cache sizes, instruction sets, and other capabilities. Many of these capabilities can only be exploited by applications that are written and/or compiled to use them. However, optimizing applications to use newer processor capabilities can often limit the compatibility of those applications with older processors that do not have those capabilities. Accordingly, many of those newer processor capabilities are slow to be fully utilized.

Various techniques exist for exploiting newer processor capabilities while maintaining backwards compatibility with older processors. One such technique involves dynamic compilation, such as in the JAVA programming language, which effectively generates the compiled application code (e.g., the "binary") at execution time according to the capabilities of the system on which the application is being compiled. While this can exploit the capabilities of the target system, there are also a number of limitations, including appreciable overhead and risk in performing the compilation at runtime. Another such technique involves compiling the application code to link to platform-specific libraries, which can include versions of common functions (e.g., matrix multiply) for different types of platforms. This technique is often limited to accelerating only a small set of computations (e.g., those involving particular common functions). Yet another such technique involves compiling the entire application code for each of multiple platforms and stitching the resulting binaries together into one large file. This technique, sometimes referred to as "fat binaries," typically results in very large files and its use tend to be limited to providing compatibility among distinct instruction set architectures (ISAs), rather than among variations within a given ISA.

BRIEF SUMMARY

Among other things, embodiments provide novel systems and methods for generating platform specific optimizations in static compilers. Embodiments operate in context of a static compiler, or the like, to generate a single application code binary that exploits new platform-specific capabilities, while maintaining backward compatibility with other older platforms. In one embodiment, application code is profiled to determine which code regions are main contributors to the runtime execution of the application. For each hot code region, a determination is made as to whether multiple versions of the hot code region should be produced for different target platform models. For example, each hot code region can be independently analyzed to determine if benefits can be achieved by exploiting platform-specific capabilities corresponding to each of N platform models, which can result in between one and N versions of that particular hot code region. Navigation instructions are generated as part of the application code binary to permit a target machine to select appropriate versions of the hot code sections at load time, according to the target machine's capabilities.

According to one set of embodiments, a system is provided for static compilation of application code. The system includes a data store, a computer-implemented code profiler, and a computer-implemented code versioner. The data store operates to store application code comprising a number of code regions and to store a number of machine models that each models capabilities of a corresponding target platform. The computer-implemented code profiler operates to identify hot code regions from the code regions of the application code, such that each hot code region is a primary contributor to runtime execution of the application code. The computer-implemented code versioner operates, for each hot code region, to: compile a first version of the hot code region according to a first of the machine models, the first version having a first estimated execution time; compile a second version of the hot code region according to a second of the machine models, the second version having a second estimated execution time; and compile the application code to include both the first and the second versions of the hot code region when a difference between the first and second estimated execution times is greater than a predetermined threshold, the application code being compiled in such a way that permits selection by a target machine at load time between the first and second versions of the hot code region.

According to another set of embodiments, a computer-implemented method is provided for static compilation of application code. The method includes: profiling application code to identify hot code regions from a number of code regions of the application code, such that each hot code region is a primary contributor to runtime execution of the application code; and for each identified hot code region: compiling a first version of the hot code region according to a first of a number of machine models that each models capabilities of a corresponding target platform, the first version having a first estimated execution time; compiling a second version of the hot code region according to a second of the machine models, the second version having a second estimated execution time; and compiling the application code to include both the first and the second versions of the hot code region when a difference between the first and second estimated execution times is greater than a predetermined threshold, the application code being compiled in such a way that permits selection by a target machine at load time between the first and second versions of the hot code region.

BRIEF DESCRIPTION OF THE DRAWINGS

The present disclosure is described in conjunction with the appended figures.

Figure 1:
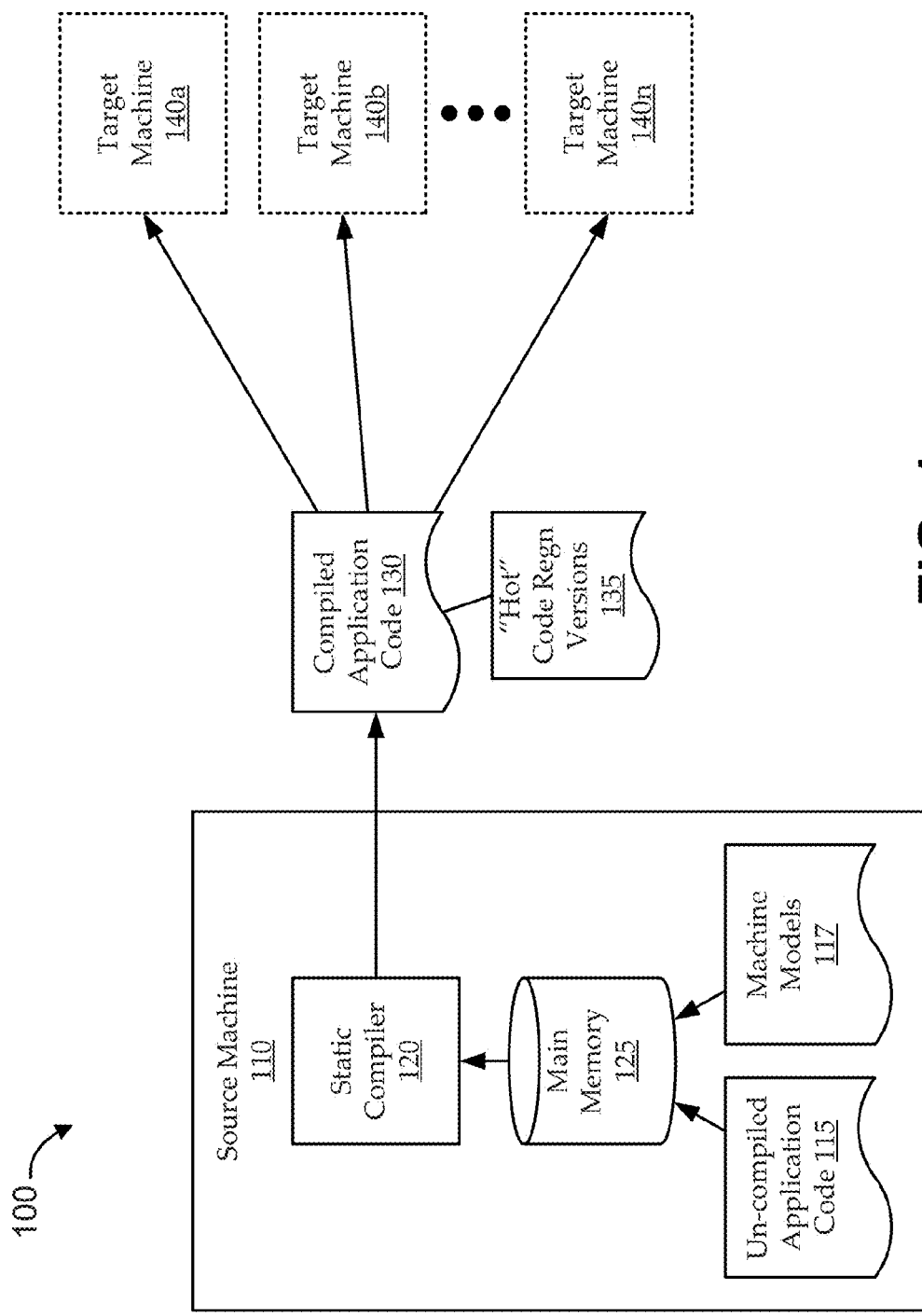
FIG. 1 shows a block diagram of an illustrative system that provides a context for various embodiments.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

Computational system companies continuously release new platforms (e.g., processors) with new capabilities. A goal of these new capabilities is often to make applications run faster and/or more efficiently. Each new generation of computational platform (e.g., processor) brings new capabilities, like faster clock speeds, larger cache sizes, different instruction sets, etc. For example, a new instruction set can be introduced with new instructions (e.g., multiply-add, conditional move, conditional store, etc.), new instruction types (e.g., single instruction multiple data (SIMD) instructions, crypto instructions, etc.), etc. The platform differences can be seen among different instruction set architectures (ISAs) (e.g., between an x86-based platform and a SPARC-based platform) and among different versions of the same ISA (e.g., different generations of a SPARC-based processor). Accordingly, over time, end users of an application can have many different types of platforms with many different types of capabilities. It is often desirable to release a single binary (i.e., compiled application code) that exploits the latest processor capabilities, while maintaining compatibility with other platforms that may have fewer or different capabilities. However, optimizing applications to use newer processor capabilities can often limit the compatibility of those applications with platforms that do not support those same capabilities. Accordingly, many of those newer processor capabilities are slow to be fully utilized.

Some applications are released with code that is compiled for a single platform. The code is likely either compiled for an older platform that is highly compatible with most users' target platforms, but does not support newer platform capabilities; or compiled for a newer platform that has newer capabilities, but may not be compatible with many users' target platforms. Other applications are released in a manner that seeks to exploit some newer capabilities while maintaining at least some backwards compatibility or cross-compatibility using one or more traditional techniques.

One such technique involves dynamic compilation, such as in the JAVA programming language, which effectively generates the compiled application code (e.g., the "binary") at execution time according to the capabilities of the system on which the application is being compiled. While this can exploit the capabilities of the target system, there are also a number of limitations. One limitation is that the dynamic compilation can carry appreciable overhead, for example, by using machine resources at runtime to perform the compilation. Another limitation is that dynamically compiling applications having certain advanced (e.g., sophisticated, time consuming) operations can tend to slow down the application, rather than improving performance. Yet another limitation is that optimizing and/or modifying the application code at runtime can be risky, for example, as any compilation or other encountered issues can cause the application to have issues (e.g., not to run or to have errors). Still another limitation is that dynamic compilation can run afoul of certain licensing provisions, for example, where a license prohibits certain types of changes to the code.

Another such technique involves static compiling of the application code in such a way that links to platform-specific libraries. These libraries typically include versions of common functions for different types of platforms. For example, the code is compiled in such a way that, when it encounters a particular common function (e.g., matrix multiply) during execution, it can call a library that selects the appropriate version of the function for the platform on which the application is being executed. This technique is often limited in a number of ways. For example, the platform specific libraries typically accelerate only a small set of computations (e.g., those involving particular common functions).

Yet another such technique involves compiling the entire application code for each of multiple platforms and stitching the resulting binaries together into one large file. For example, the entire application code is compiled once for an x86-based platform and again for a SPARC-based platform, each time using the associated ISA for that platform. The target platform can then select the appropriate "version" of the application at runtime. Particularly for large applications, this technique can result in very large, so-called "fat," binaries. Accordingly, the technique tends only to be used for general cross-compatibility among a small number of different ISAs, and does not tend to be used for compatibility among larger numbers of platforms (e.g., among variations within a given ISA).

Embodiments statically compile application code to generate a single binary that exploits new platform-specific capabilities, while maintaining backward compatibility with other older platforms. In one embodiment, application code is profiled to determine which code regions (e.g., basic blocks, loops, sets of nested loops, functions, etc.) are main contributors to the runtime execution of the application (referred to herein as "hot" code regions). For example, only five percent of the application code may contribute fifty percent of the runtime of the application. For each hot code region, a determination is made as to whether multiple versions of the hot code region should be produced for different target platform models. For example, each hot code region can be independently analyzed to determine if benefits can be achieved by exploiting platform-specific capabilities corresponding to each of N platform models, which can result in between one and N versions of that particular hot code region. The target machine can then select the appropriate versions of those sections at load time, according to the target machine's capabilities.

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention. Further, as used herein, the term "platform," or the like, is intended to generally convey a particular ISA or a particular version of an ISA. Thus, while some embodiments described herein are intended to platform-specific optimizations across versions of the same ISA, similar techniques can be applied to platform-specific optimizations across different ISAs without departing from the scope of embodiments.

Turning first to FIG. 1, a block diagram is shown of an illustrative system 100 that provides a context for various embodiments. The system 100 includes a source machine 110 that has a static compiler 120 for compiling un-compiled application code 115 into compiled application code 130 for execution by multiple target machines 140 having different capabilities. As illustrated, the source machine 110 has a main memory 125 that can store the un-compiled application code 115 and a number of machine models 117. Each machine model 117 can represent the capabilities of a particular platform, for example, a version of an ISA.

It is assumed that each machine model 117 represents a different set of capabilities, and that one of the machine models 117 represents a "generic" machine model. The generic machine model is considered the machine model 117 likely to have the widest compatibility (e.g., the "least common denominator" with respect to various platform capabilities). In some implementations, the remaining machine models 117 can each be ordered by capability (e.g., the machine models 117 represent versions of a common ISA for which each version is an enhancement to the previous version). In other implementations, the remaining machine models 117 have different types of capabilities that may or may not be ordered. For example, between two machine models 117, one may represent a platform having a larger instruction set, while the other may represent a platform having a larger level 1 (L1) cache. Accordingly, capabilities of one machine model 117 may be more "optimal" with respect to certain types of code (e.g., those types that can exploit the larger instruction set), while capabilities of the other machine model 117 may be more "optimal" with respect to other types of code (e.g., those types that can exploit the larger L1 cache). In some embodiments, one of the machine models 117 represents a hypothetical or actual "best case" platform. For example, the best case platform may include a real or hypothetical set of capabilities that exceeds those of the other machine models 117.

As discussed above, embodiments of the static compiler 120 profile the application code to identify "hot" code regions. For each hot code region, a determination is made as to whether execution of the application can be improved by generating multiple versions of the hot code region for some or all of the different machine models 117. For example, a hot code region can be analyzed to determine if there is an appreciable difference in execution of the code region between compiling the region according to the "generic" machine model 117 and compiling the code region according to the "best case" machine model 117. The output of the static compiler 120 is compiled application code 130 having various hot code region versions 135 to optimize execution of the application on different target machines 140. The target machines 140 can then select the appropriate versions of those sections at load time, according to the target machine's 140 capabilities.

Figure 2:
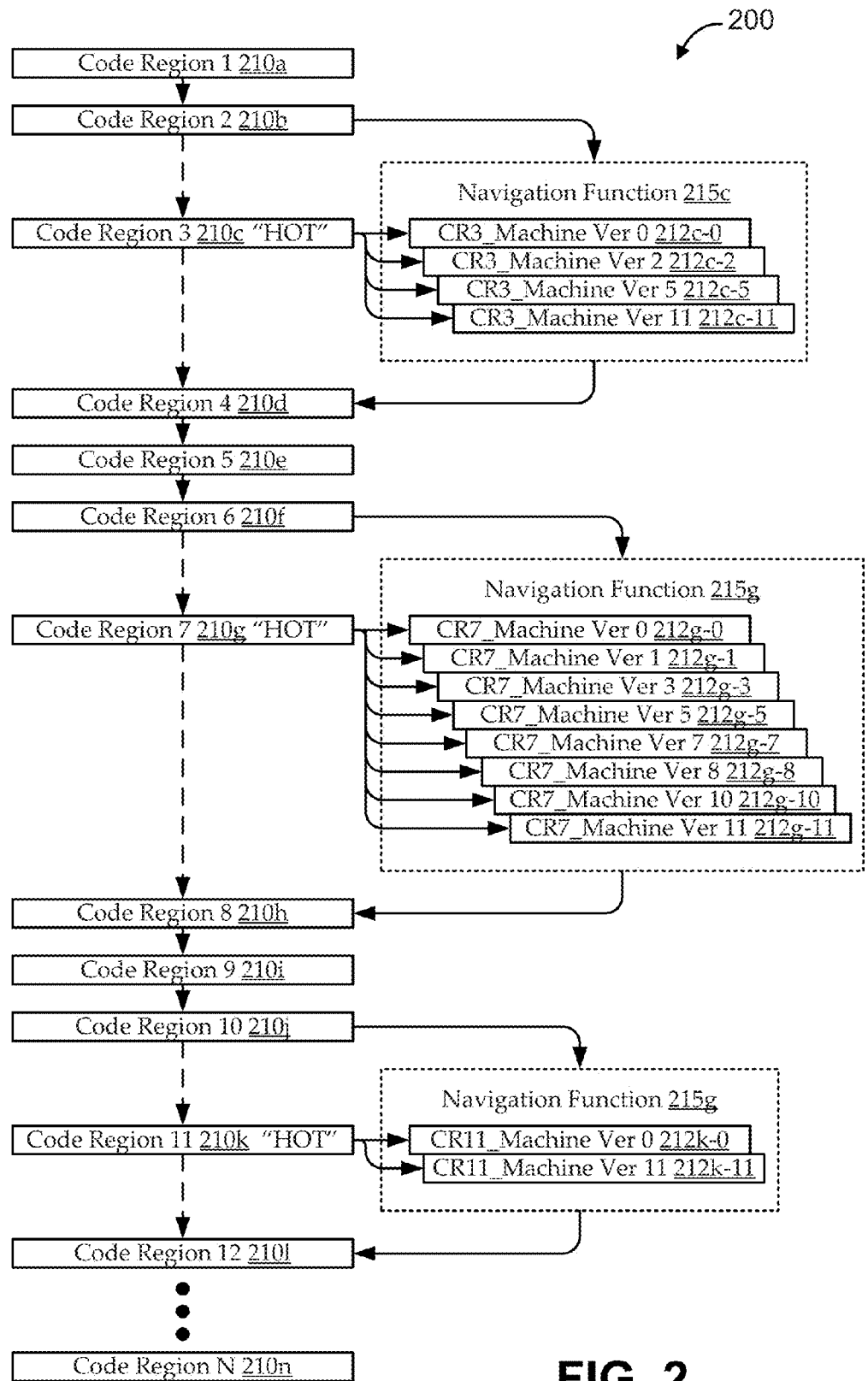
FIG. 2 shows an illustrative set of application code having a number of code regions, according to various embodiments.

Turning to FIG. 2, an illustrative set of application code 200 is shown having a number of code regions 210, according to various embodiments. Embodiments profile the application code to identify various code regions 210. For the sake of simplicity, a small number of code regions 210 is shown, and they are illustrated as executing in a linear fashion (e.g., the illustration ignores loops, branches, etc.). Further, while three out of the twelve enumerated code regions 210 are illustrated as "hot" code regions, and any number of regions can be identified as hot regions, it is typically expected that only a small subset (e.g., five percent) of the code regions 210 will be identified as hot.

For the sake of illustration, code region 3 210c, code region 7 210g, and code region 11 210k are identified as "hot" code regions. This identification can be performed using a number of techniques. One technique involves dynamic profiling (e.g., using profile feedback information). For example, a code profiler maintains counters on each code region 210 during application execution to determine contributions of each code region 210 to the overall runtime of the application. Another technique involves directive-based analysis. For example, code sections 210 can be annotated with one or more directives (e.g., "#pragma") that indicate whether a code region is likely to be hot. The annotation can explicitly indicate that the code section 210 is hot, or it can include information that is usable by the compiler to determine that the code section 210 is likely to be hot. Yet another technique involves static profiling (e.g., synthetic static profiling) of the application code without executing the code. For example, if a particular code region 210 is called by many other code regions 210, it may be assumed to be a hot region. In some implementations, identifying hot code regions involves identifying "cold" (or not hot) code regions, and modifying techniques described herein accordingly.

After identifying the hot code regions, embodiments determine whether to generate one or more code versions 212 for each hot code region corresponding to one or more machine models. In some implementations, a version 212 is generated at least for the "generic" machine model. This can be the default version 212 of the code region to be used by any target machine that does not support capabilities associated with other versions 212 of the code. In some cases, where it is determined that no other version 212 should be generated, the version 212 corresponding to the generic machine model can be the only version 212 of the code.

Various techniques can be used to generate the various code region versions 212. In some embodiments, the code region 210 is compiled according to the generic machine model (e.g., "Machine_Ver 0"), and execution time of this code region version 212 is estimated. The code region 210 is compiled again according to the "best case" machine model (e.g., "Machine_Ver 11"), and execution time of this code region version 212 is estimated. If the code region 210 includes elements that can be optimized by platform capabilities of the best case machine model, it is assumed that the "best case" execution time (i.e., the estimated execution time corresponding to the best case machine model) will be shorter than the "generic" execution time (i.e., the estimated execution time corresponding to the generic machine model). Accordingly, if the difference between the best case and generic execution times exceeds a threshold amount (e.g., five percent), it is assumed that there is sufficient benefit to generating at least two versions of the hot code region 210. Having made that determination, the code region 210 can be re-compiled for some or all of the other machine models to determine (e.g., in a similar manner to the above) which machine models provide sufficient benefit to warrant generating a corresponding code region version 212.

Different code regions 210 can have a variety of instructions and other features that can benefit differently from different types of platform-specific capabilities. As such, machine model differences may have an appreciable impact on execution times of certain code regions 210 and very little or no impact on execution times of other code regions 210. As illustrated in FIG. 2, four different machine models showed an appreciable impact on execution time of code region 3 210c (i.e., resulting in four versions of the code), as compared to eight machine models for code region 7 210g, and only two machine models for code region 11 210k. Further, different capabilities can impact the code regions 210 differently. For example, as illustrated, platform-specific capabilities of machine model '2' apparently had an appreciable impact to code region 3 210c, but not to code region 7 210g or code region 11 210k.

In some embodiments, a navigation instruction 215 is used to identify the appropriate code region version 212 for a target machine at load time. In certain implementations, each version is "outlined" into a corresponding function. The functions can be marked with an indication of the corresponding target machine model (e.g., ISA type and version, platform-specific capabilities, etc.). The target machine (e.g., executing system) can use the marking to link the appropriate function at load time corresponding to its hardware and/or other capabilities. In other implementations, if-then statements, "in-lining," or other techniques, can be used to indicate the appropriate version to use at load time (e.g., the code indicates that, if the target machine corresponds to machine model 'N', then version 'N' of the code should be used). Regardless of the technique used, embodiments link to the appropriate version of the hot code regions 210 at load time. Accordingly, when the application executes, the hot regions of the executable code are tailored for at least some of the capabilities of the executing system.

Figure 3:
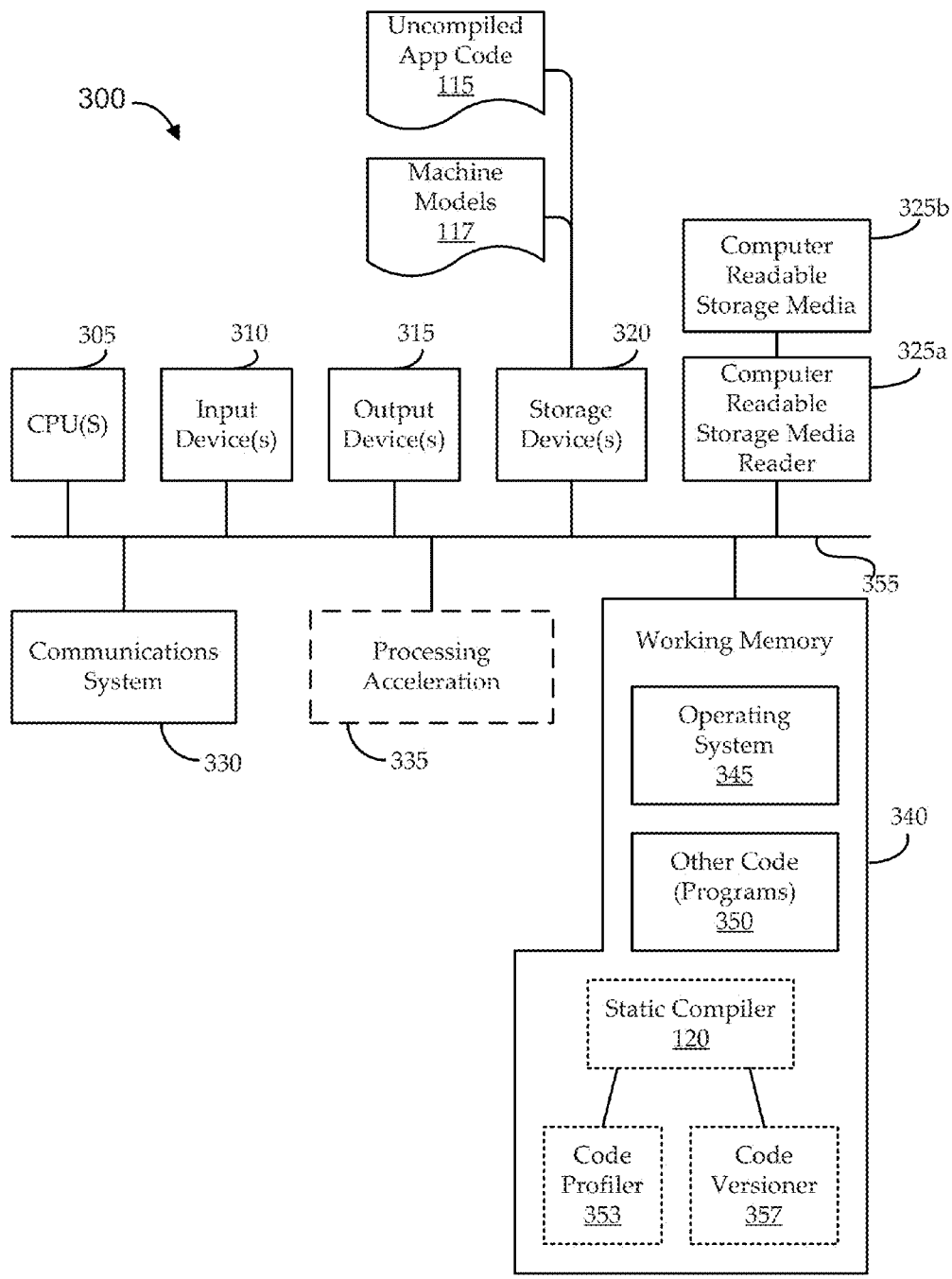
FIG. 3 shows an illustrative computational system for implementing one or more systems or components of systems, according to various embodiments.

FIG. 3 shows an illustrative computational system 300 for implementing one or more systems or components of systems, according to various embodiments. The computational system 300 is described as a source machine implementing static compiler functionality, like the source machine system 110 described with reference to FIG. 1. Embodiments of the computational system 300 can be implemented as or embodied in single or distributed computer systems, or in any other useful way.

The computational system 300 is shown including hardware elements that can be electrically coupled via a bus 355. The hardware elements can include one or more central processing units (CPUs) 305, one or more input devices 310 (e.g., a mouse, a keyboard, etc.), and one or more output devices 315 (e.g., a display, a printer, etc.). The computational system 300 can also include one or more storage devices 320. By way of example, storage device(s) 320 can be disk drives, optical storage devices, solid-state storage device such as a random access memory (RAM) and/or a read-only memory (ROM), which can be programmable, flash-updateable and/or the like. In some embodiments, the storage devices 320 are configured to store un-compiled application code 115, machine models 117, and/or other useful information for facilitating functionality described herein.

The computational system 300 can additionally include a computer-readable storage media reader 325a, a communications system 330 (e.g., a modem, a network card (wireless or wired) or chipset, an infra-red communication device, etc.), and working memory 340, which can include RAM and ROM devices as described above. In some embodiments, the computational system 300 can also include a processing acceleration unit 335, which can include a DSP, a special-purpose processor and/or the like.

The computer-readable storage media reader 325a can further be connected to a computer-readable storage medium 325b, together (and, optionally, in combination with storage device(s) 320) comprehensively representing remote, local, fixed, and/or removable storage devices plus storage media for temporarily and/or more permanently containing computer-readable information. The communications system 330 can permit data to be exchanged with a public or private network and/or any other system.

The computational system 300 can also include software elements, shown as being currently located within a working memory 340, including an operating system 345 and/or other code 350, such as an application program (which can be a client application, web browser, mid-tier application, relational database management system (RDBMS), etc.). As illustrated, a static compiler 120, having a code profiler 353 and a code versioner 357, can be implemented as applications in working memory 340. For example, as described above, the code profiler 353 can identify hot code regions, and the code versioner 357 can generate one or more versions of those hot code regions according to one or more machine models 117, as appropriate. Each of these applications can also include various stored information, as described above.

It should be appreciated that alternate embodiments of a computational system 300 can have numerous variations from that described above. For example, customized hardware might also be used and/or particular elements might be implemented in hardware, software (including portable software, such as applets), or both. Further, connection to other computing devices such as network input/output devices can be employed. In various embodiments a computational system 300 like the one illustrated in FIG. 3 is used to implement one or more functions of the systems described above, and the computational system 300 can be in communication with other functional components as needed or desired. In other embodiments, computational systems 300 like the one illustrated in FIG. 3 are used to implement one or more methods of the system, such as those described below.

Figure 4:
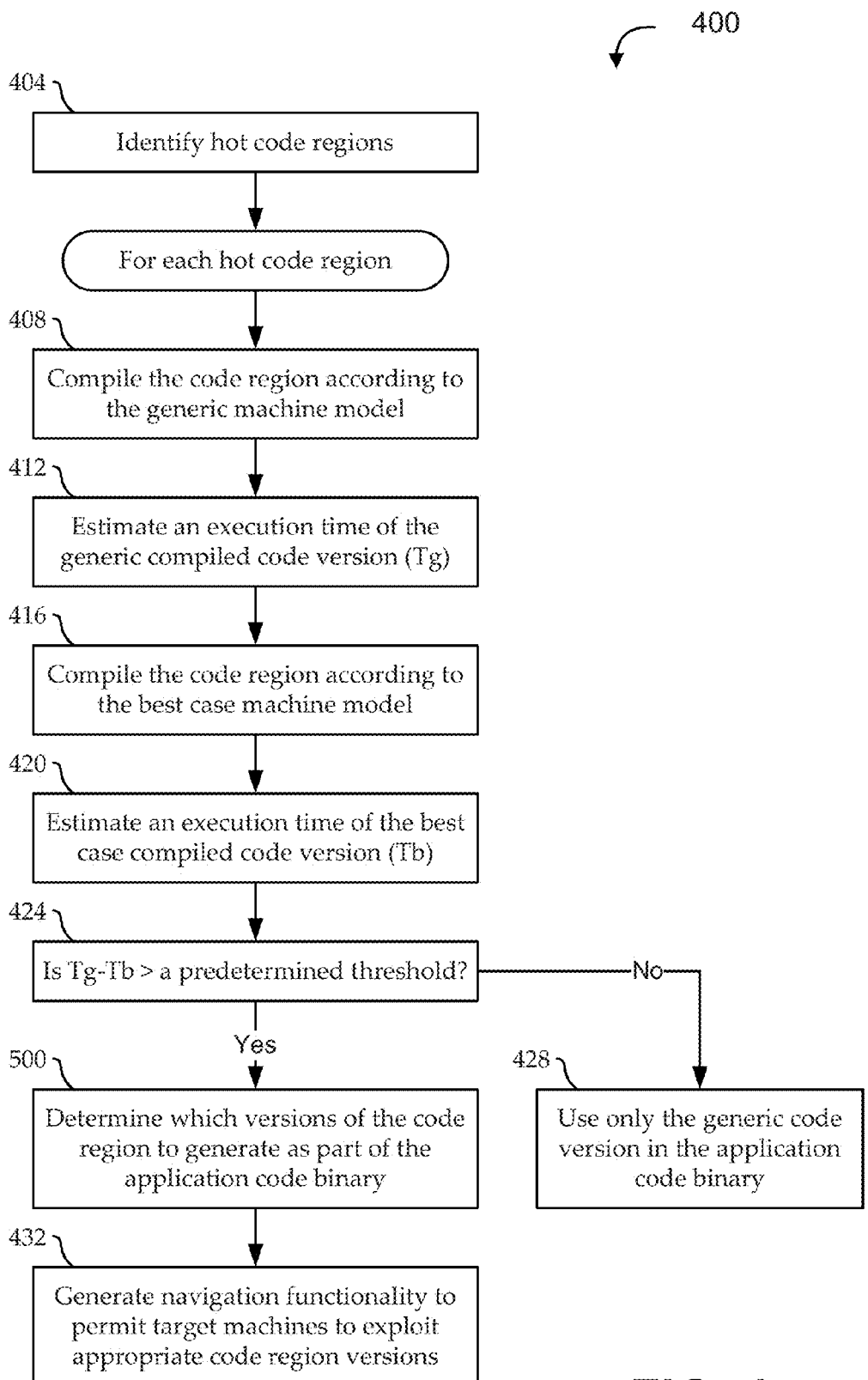
FIG. 4 shows a flow diagram of an illustrative method for platform specific optimization in static compilers, according to various embodiments.

Turning to FIG. 4, a flow diagram is provided of an illustrative method 400 for platform specific optimization in static compilers, according to various embodiments. Embodiments of the method 400 begin at stage 404 by identifying code regions within application code that are main contributors to execution time of the application code, referred to herein as "hot" code regions. As described above, the hot code regions can be identified using any suitable technique, such as dynamic profiling, directive-based analysis, static profiling, etc. Having identified the hot code regions, embodiments of the method 400 proceed for each of those identified regions.

At stage 408, the hot code region being analyzed is compiled according to a first (e.g., "generic," or lowest common denominator) machine model. An estimate of the execution time of this generic version of the compiled code (Tg) is calculated at stage 412. For example, Tg can represent a worst case execution time for the compiled code assuming a least capable execution platform. At stage 416, the hot code region is compiled according to a "best case" machine model. The best case model can represent an actual platform configuration or a hypothetical platform configuration. An estimate of the execution time of this best case version of the compiled code (Tb) is calculated at stage 420. For example, Tb can represent a best case execution time for the compiled code assuming a most capable execution platform.

At stage 424, a determination is made as to whether the difference in platform capability between the best case machine model and the generic machine model has a sufficient impact on the code region to warrant generating multiple code region versions. For example, if the difference between Tg and Tb is greater than a predetermined threshold (e.g., five percent), this can be considered a sufficient difference to warrant generating multiple versions. Other implementations can use any suitable threshold determination. For example, the determination can be calculated as "Tg−Tb>Threshold", where Threshold represents an amount of execution time; "Tg/Tb>Threshold", where Threshold represents a ratio; "(1−Tg/Tb)*100>Threshold", where Threshold represents a percentage; etc. In some implementations, the threshold can be tuned to yield desired results. If it is determined at stage 424 that the difference in platform capability between the best case machine model and the generic machine model has less than the threshold impact on the code region, no additional code region versions are generated. As illustrated, at stage 428, only the generic code region version is used as part of the compiled application code. If it is determined at stage 424 that the difference in platform capability between the best case machine model and the generic machine model has at least the threshold impact on the code region, one or more additional code region versions are generated according to stage 500 (as described with reference to method 500 of FIG. 5 below).

At stage 432, appropriate navigation instructions are generated as part of the application code binary to permit target machines to exploit the generated versions of the hot code regions, as appropriate. In some implementations, each code region version is "outlined" into a corresponding function, which can be linked by the target machine at load time as facilitated by the navigation instructions (e.g., including appropriate marking of the functions to permit the target machines to identify the best compatible version). In other implementations, if-then statements, "in-lining," or other techniques, can be used to indicate the appropriate version to use at load time. In this way, when the application executes, the hot regions of the executable code are tailored for at least some of the capabilities of the executing system.

Figure 5:
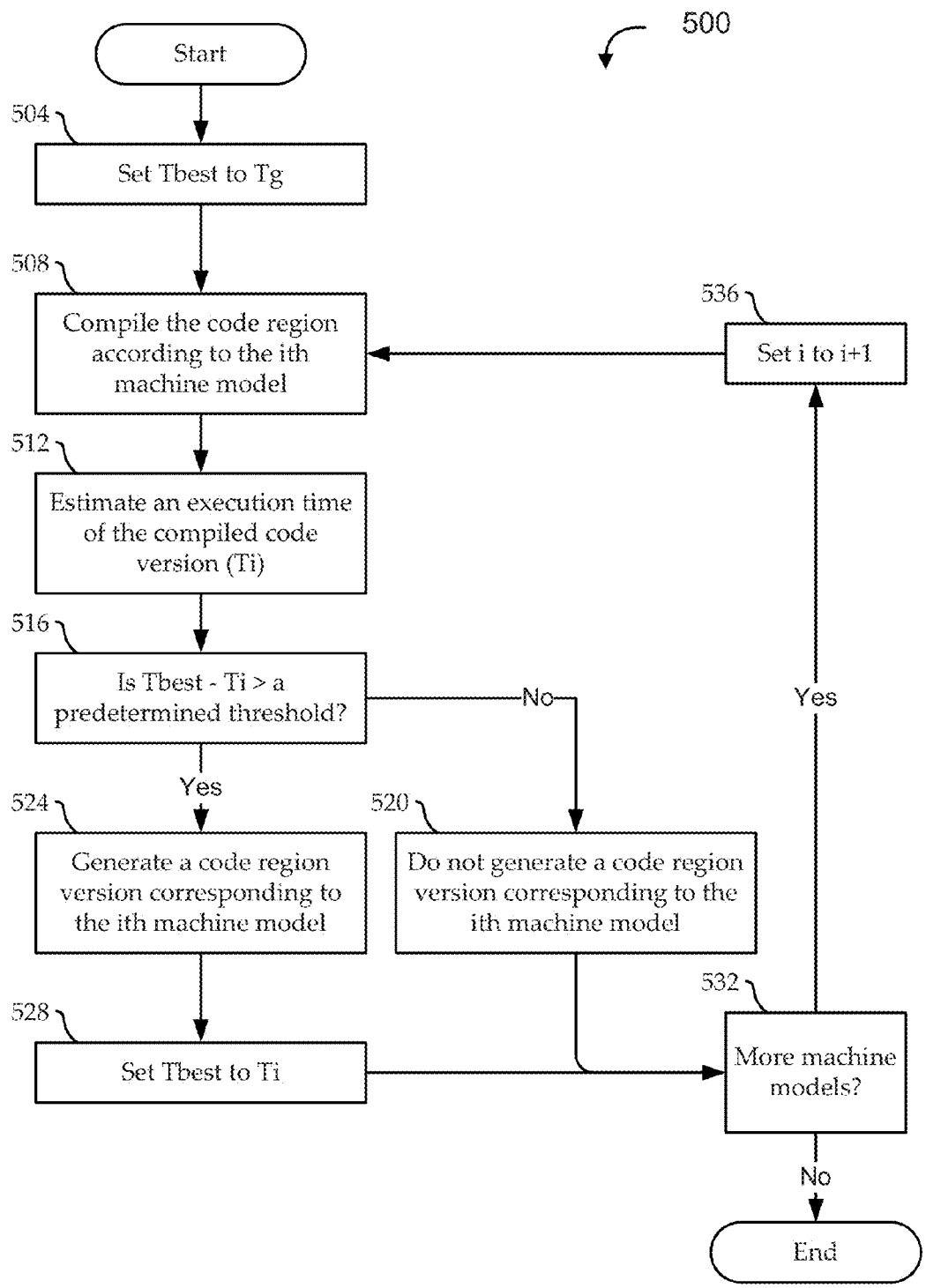
FIG. 5 shows a flow diagram of an illustrative method for generating code region versions, as appropriate, according to various embodiments.

FIG. 5 shows a flow diagram of an illustrative method 500 for generating code region versions, as appropriate, according to various embodiments. Embodiments of the method 500 begin at stage 504 by setting a hypothetical "best" execution time (Tbest) to the execution time associated with the generic code region version (Tg) estimated in stage 412 of FIG. 4. Typically, prior to initiating the method 500, a determination has already been made (e.g., at stage 424 of FIG. 4) that the "best case" execution time is more than a threshold amount faster than the "generic" execution time. Still, embodiments of the method 500 begin with an assumption that Tbest is Tg.

At stage 508, the hot code region being analyzed is compiled according to an "ith" machine model. For example, there are N machine models, and 'i' ranges from '1' (the machine model representing the next most capable platform after the generic machine model) to 'N' (the machine model representing the most capable platform, which may or may not be the same as the "best case" machine model described above). The N machine models can be ordered by capability or in any other suitable manner (e.g., by some predetermined order of preference). An estimate of the execution time of this "ith" version of the compiled code (Ti) is calculated at stage 512. At stage 516, a determination is made as to whether the difference in platform capability between the ith machine model and the generic machine model has a sufficient impact on the code region to warrant generating a code region version corresponding to the ith machine model. For example, if the difference between Tbest (which is equal to Tg in this iteration) and Ti is greater than a predetermined threshold, this can be considered a sufficient difference to warrant generating another version (or any other suitable threshold determination can be used, for example, as described above). The predetermined threshold can be the same as or different from the threshold used in stage 424 of FIG. 4.

If it is determined at stage 516 that the difference in platform capability between the ith machine model and the generic machine model has less than the threshold impact on the code region, no additional code region version is generated for the ith machine model, as illustrated by stage 520. If it is determined at stage 516 that the difference in platform capability between the ith machine model and the generic machine model has at least the threshold impact on the code region, a code region version corresponding to the ith machine model is generated according to stage 524, and the hypothetical best execution time (Tbest) is set to Ti at stage 528.

Embodiments iteratively perform a similar technique for each of the remaining machine models (or for a subset of machine models in some implementations). To that end, at stage 532, a determination is made as to whether additional machine models exist for evaluation. If not, the method 500 can end. If so, a next machine model can be evaluated by setting 'i' to 'i+1' at stage 536 (i.e., so that the ith machine model of the next iteration is actually the (i+1)th machine model). Returning to stage 508, the hot code region being analyzed is compiled according to the next ith machine model, and an estimate of the execution time of this version (Ti) is calculated at stage 512. At stage 516, a determination is again made as to whether the difference in platform capability between the ith machine model and Tbest (i.e., the machine model corresponding to the last-generated code region version) has a sufficient impact on the code region to warrant generating another code region version corresponding to this ith machine model. For example, if the difference between Tbest and Ti is greater than a predetermined threshold, this can be considered a sufficient difference to warrant generating another version. If the difference has less than the threshold impact on the code region, no additional code region version is generated for the ith machine model, as illustrated by stage 520. If the difference has at least the threshold impact on the code region, a code region version corresponding to the ith machine model is generated according to stage 524, and the hypothetical best execution time (Tbest) is again set to Ti at stage 528. As described above, this iterative process can result in between 1 and N versions for each hot code region, and the number of version can differ from one hot code region to another depending on the impact of platform-specific capabilities on those regions.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The various operations of methods and functions of certain system components described above may be performed by any suitable means capable of performing the corresponding functions. The means may include various hardware and/or software component(s) and/or module(s), including, but not limited to a circuit, an application specific integrated circuit (ASIC), or processor. For example, logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A system for static compilation of application code, the system comprising:
    a set of processors;
    a tangible data store that operates to store application code comprising a plurality of code regions and to store a plurality of machine models that each models capabilities of a corresponding target platform;
    a computer-implemented code profiler that directs the set of processors to identify hot code regions from the plurality of code regions of the application code, such that each hot code region is a primary contributor to runtime execution of the application code; and
    a computer-implemented code versioner that directs the set of processors, for each hot code region, to:
        compile a first version of the hot code region according to a first of the machine models, the first version having a first estimated execution time;
        compile a second version of the hot code region according to a second of the machine models, the second version having a second estimated execution time; and
        compile the application code to include both the first and the second versions of the hot code region when a difference between the first and second estimated execution times is greater than a predetermined threshold, the application code being compiled in such a way that permits selection by a target machine at load time between the first and second versions of the hot code region by generating navigation functionality in the application code that permits the target machine to load one of the versions of each hot code region according to capabilities of the target machine.

2. The system of claim 1, wherein the computer-implemented code versioner further operates, for each hot code region, to compile the application code to include only the first version of the hot code region when the difference between the first and second estimated execution times is not greater than the predetermined threshold.

3. The system of claim 1, wherein the first of the machine models represents a lowest capability target platform, wherein the predetermined threshold is a first predetermined threshold, and the computer-implemented code versioner further operates, for each hot code region, to:
    compile a third version of the hot code region according to a third of the machine models, the third of the machine models representing a highest capability target platform, the third version having a third estimated execution time; and
    determine whether a difference between the first and third estimated execution times is greater than a second predetermined threshold,
    wherein the computer-implemented code versioner operates to compile the second version only when the difference between the first and third estimated execution times is greater than the second predetermined threshold.

4. The system of claim 3, wherein the plurality of machine models is ordered from 1 to N, and the computer-implemented code versioner further operates, when the difference between the first and third estimated execution times is greater than the second predetermined threshold, to:
    set a purported best execution time (Tbest) to the first execution time; and
    for i=1 to N:
    compile an ith version of the hot code region according to an ith of the machine models, the ith version having an ith estimated execution time;
    compile the application code to further include the ith version of the hot code region when a difference between the Tbest and ith estimated execution times is greater than the first predetermined threshold; and
    set Tbest to the ith execution time when the difference between the Tbest and ith estimated execution times is greater than the first predetermined threshold.

5. The system of claim 4, wherein the plurality of machine models is ordered from 1 to N according to the respective capabilities of the target platforms represented by the machine models.

6. The system of claim 1, wherein the computer-implemented code profiler operates to identify the hot code regions from the plurality of code regions of the application code by dynamic profiling of the application code.

7. The system of claim 1, wherein the computer-implemented code profiler operates to identify the hot code regions from the plurality of code regions of the application code by static profiling of the application code.

8. The system of claim 1, wherein the computer-implemented code profiler operates to identify the hot code regions from the plurality of code regions of the application code by directive-based analysis of the application code.

9. The system of claim 1, wherein generating the navigation functionality in the application code comprises:
outlining each version into a corresponding function in such a way that permits linking of one of the corresponding functions by the target machine at load time.

10. The system of claim 1, wherein the plurality of machine models comprises a generic machine model representing a least common denominator of platform capabilities relative to the other machine models.

11. The system of claim 1, wherein each of the plurality of code regions comprises at least one of a basic code block, a loop, a set of nested loops, or a function.

12. A computer-implemented method for static compilation of application code, the method comprising:
profiling application code to identify hot code regions from a plurality of code regions of the application code, such that each hot code region is a primary contributor to runtime execution of the application code; and
for each identified hot code region:
compiling a first version of the hot code region according to a first of a plurality of machine models that each models capabilities of a corresponding target platform, the first version having a first estimated execution time;
compiling a second version of the hot code region according to a second of the machine models, the second version having a second estimated execution time; and
compiling the application code to include both the first and the second versions of the hot code region when a difference between the first and second estimated execution times is greater than a predetermined threshold, the application code being compiled in such a way that permits selection by a target machine at load time between the first and second versions of the hot code region by generating navigation functionality in the application code that permits the target machine to load one of the versions of each hot code region according to capabilities of the target machine.

13. The method of claim 12, further comprising, for each hot code region, compiling the application code to include only the first version of the hot code region when the difference between the first and second estimated execution times is not greater than the predetermined threshold.

14. The method of claim 12, wherein the first of the machine models represents a lowest capability target platform, wherein the predetermined threshold is a first predetermined threshold, and further comprising, for each hot code region:
compiling a third version of the hot code region according to a third of the machine models, the third of the machine models representing a highest capability target platform, the third version having a third estimated execution time; and
determining whether a difference between the first and third estimated execution times is greater than a second predetermined threshold,
wherein the compiling the second version step is performed only when the difference between the first and third estimated execution times is greater than the second predetermined threshold.

15. The method of claim 14, wherein the plurality of machine models is ordered from 1 to N, and further comprising, when the difference between the first and third estimated execution times is greater than the second predetermined threshold:
setting a purported best execution time (Tbest) to the first execution time; and
for i=1 to N:
compiling an ith version of the hot code region according to an ith of the machine models, the ith version having an ith estimated execution time;
compiling the application code to further include the ith version of the hot code region when a difference between the Tbest and ith estimated execution times is greater than the first predetermined threshold; and
setting Tbest to the ith execution time when the difference between the Tbest and ith estimated execution times is greater than the first predetermined threshold.

16. The method of claim 15, wherein the plurality of machine models is ordered from 1 to N according to the respective capabilities of the target platforms represented by the machine models.

17. The method of claim 14, wherein the first and second predetermined thresholds are substantially equivalent.

18. The method of claim 12, wherein compiling the application code in such a way that permits selection by a target machine at load time between the first and second versions of the hot code region comprises outlining each version into a corresponding function in such a way that permits linking of one of the corresponding functions by the target machine at load time.

19. The method of claim 12, wherein profiling the application code to identify the hot code regions from the plurality of code regions comprises performing at least one of dynamic profiling of the application code, static profiling of the application code, or directive-based analysis of the application code.

* * * * *

UNITED STATES PATENT AND TRADEMARK OFFICE
CERTIFICATE OF CORRECTION

PATENT NO. : 9,032,379 B2  
APPLICATION NO. : 13/924322  
DATED : May 12, 2015  
INVENTOR(S) : Kalogeropulos et al.

Page 1 of 1

It is certified that error appears in the above-identified patent and that said Letters Patent is hereby corrected as shown below:

Title page

Primary Examiner, line 1, delete "Dong Wong" and insert -- Don Wong --, therefor.

On page 2, column 2, under Attorney, Agent or Firm, line 2, delete "Breygofle LLP" and insert -- Breyfogle LLP --, therefor.

Specification

In column 9, line 37, delete "pretermined" and insert -- predetermined --, therefor.

Signed and Sealed this  
Ninth Day of February, 2016

Michelle K. Lee  
*Director of the United States Patent and Trademark Office*